(12) United States Patent
Anderson

(10) Patent No.: US 6,970,635 B2
(45) Date of Patent: Nov. 29, 2005

(54) METHOD OF AND APPARATUS FOR SETTING APPARENT LENGTH OF OPTICAL FIBER

(75) Inventor: Charles W. Anderson, Pasadena, MD (US)

(73) Assignee: The Johns Hopkins University, Baltimore, MD (US)

(*) Notice: Subject to any disclaimer, the term of this patent is extended or adjusted under 35 U.S.C. 154(b) by 67 days.

(21) Appl. No.: 10/173,927

(22) Filed: Jun. 18, 2002

(65) Prior Publication Data
US 2003/0002774 A1 Jan. 2, 2003

Related U.S. Application Data

(60) Provisional application No. 60/299,796, filed on Jun. 21, 2001.

(51) Int. Cl.[7] ................................................. G02B 6/00
(52) U.S. Cl. ........................ 385/147; 385/123; 356/73.1
(58) Field of Search ................................. 385/147, 123, 385/15, 31; 356/73.1

(56) References Cited

U.S. PATENT DOCUMENTS

| 6,442,311 | B1 | * | 8/2002 | Barbarossa et al. | ........... 385/37 |
| 6,823,110 | B2 | * | 11/2004 | Battiato et al. | ............... 385/37 |
| 2003/0138205 | A1 | * | 7/2003 | Dragone | ...................... 385/37 |

* cited by examiner

Primary Examiner—Sung Pak

(57) ABSTRACT

A method of setting an apparent optical length of an optical fiber for a given optical wavelength includes heating the trimmed optical fiber to selectively vary a refractive index thereof in response to comparison of a determined arrival phase angle with a reference value representing a desired arrival phase angle to change the determined arrival phase angle so that a difference between the desired and determined arrival phase angles does not exceed an acceptable tolerance of a phase error.

17 Claims, 7 Drawing Sheets

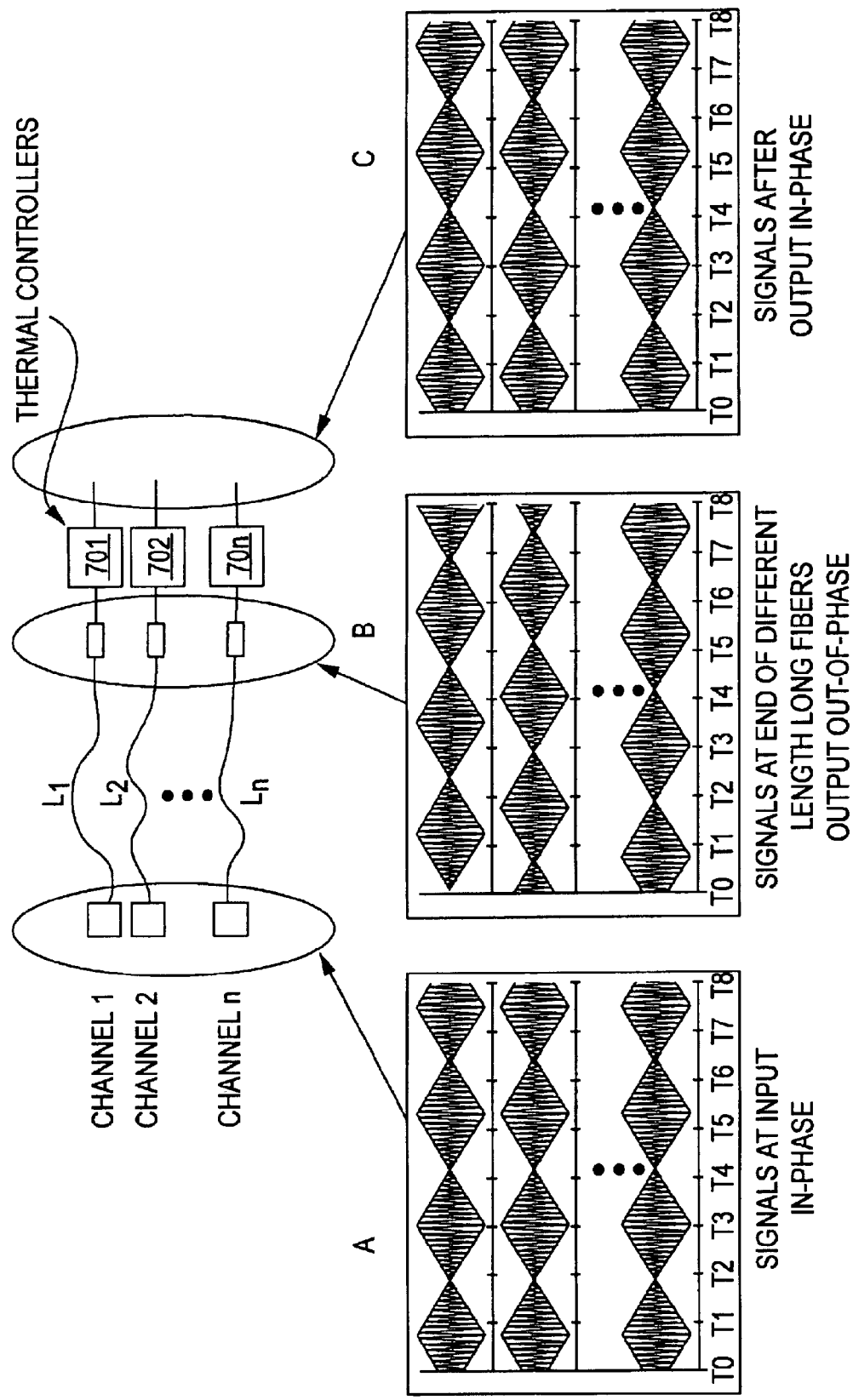

METHOD OF AND APPARATUS FOR SETTING APPARENT LENGTH OF OPTICAL FIBER

CROSS-REFERENCE TO RELATED APPLICATION

This application claims priority to Provisional Application No. 60/299,796 filed on Jun. 21, 2001 entitled "Optical Beamformer", the contents of which are hereby incorporated by reference.

STATEMENT OF GOVERNMENTAL INTEREST

This invention was made with Government support under DARPA Contract No. MDA 972-96-D-0002. The Government has certain rights in the invention.

BACKGROUND OF THE INVENTION

1. Field of the Invention

The invention relates to a method and system for controlling transmission and reception of signals traveling through multiple optical fibers. Particularly, this invention relates a method and apparatus for setting an apparent optical length of multiple fibers transmitting an optical signal of a given wavelength, wherein the apparent optical length being a function of a refractive index of each individual fiber and its actual length.

2. Description of the Related Art

Communication via beams of light traveling over thin glass fibers forms a major part of numerous infrastructures for national communication networks. Fibers find their greatest use in telephone networks, local-area networks, and cable television networks. They are also useful for short data links, closed circuit video and audio links, and elsewhere. Typically, the fiber-optic networks are digital and often transmit hundreds of thousands of channels along a single cable which may contain up to hundreds of individual fibers. Fibers are practical for a range of path lengths from under a meter to as long as required on the earth's surface and beneath its oceans.

Optical fibers are thin, long cylindrical structures which support light propagation through total internal reflection. An individual optical fiber consists of an inner core and an outer cladding typically made of silica glass, although other materials like plastics are sometimes used. Optical fiber, being a physical medium, is subjected to perturbation of one kind or the other at all times. It therefore experiences geometrical (size, shape) and optical (refractive index, mode conversion) changes to a larger or lesser extent depending upon the nature and the magnitude of the perturbation. In communication applications, such effects can negatively affect signal transmission and reception, and therefore it is desirable to minimize these effects.

Since light is characterized by amplitude (intensity), phase, frequency and polarization, any one or more of these parameters may undergo a change. The usefulness of a fiber optic sensor therefore depends upon the magnitude of this change and the ability to measure and quantify the same reliably and accurately.

A typical point-to-point fiber optical communication system operates to deliver light signals generated by a transmitter, which includes, for example, a modulator and a light source, to a receiver via multiple optical fibers. An input signal, such as a light wave of a given length, traveling through a long fiber arrives at the end of the fiber with a phase angle related to the apparent length of fiber, which is a function of an actual length of the fiber and its refractive index. Accordingly, if the phase angle varies from fiber to fiber, the output signals at downstream ends of individual fibers will optically interfere with one another even if a fixed, uniform input signal or in-phase input optical signals is/are launched into upstream ends of the fibers.

In many applications, it is important to control the phase relationships between the individual fiber lengths that are distributed over large distances and are subject to a variety of environmental conditions affecting the length of any given fiber. A non-uniform length of the fibers results in variation of the phase shift at downstream ends of the fibers, which can be significant enough to impair the quality of a transmitted signal(s). It is desirable that input signals transmitted through multiple fibers will emerge out of downstream ends of these fibers substantially simultaneously, e.g., the input signals will arrive at the downstream ends with a substantially uniform phase angle and, thus, optically coincide with another. Alternatively, if desired, the phase angle of the transmitted signals emerging out of the downstream ends can be varied, so that the transmitted signals will controllably interfere with one another.

It is well known that the arrival phase angle ι with which a transmitted signal emerges out of a downstream end of a fiber can be adjusted by changing an actual length of the fiber and/or a refractive index of this fiber. The refractive index is defined as n=Vvac/V, where Vvac is the speed of light in vacuum (essentially equal to that in air) and V is the speed of light.

Referring to FIG. 1, optical fibers 10 and 12 have length $L_1$ and length $L_2$, respectively. $L_1$ is not equal to $L_2$. If optical carrier wave signals are each injected into individual fibers 10, 12 in phase, then they will arrive at downstream ends 16, 18, respectively, as output signals 3 and 4 with relative phase relationships based on the fiber lengths $L_1$ and $L_2$ and the initial signal phase relationships of the optical signals 1 and 2. For simplicity of description, assume that the signals 1 and 2 originate in-phase at point A, and then the signals will arrive at receiving ends 16, 18 of the fibers 10, 12, respectively, as output signals 3 and 4 with relative phase relationships based exclusively on the fiber lengths. The arrival phase angle of the signal at the end of the optical fiber can be determined in accordance with the following formula:

$$\iota = 2\pi n L / \square_0 \qquad (1)$$

where n is the index of refraction and $\square_0$ is the wavelength of light in the vacuum and L is fiber length. Based on equation (1), the fiber length can be determined in accordance with the following equation:

$$L = \iota \square_0 / 2\pi n \qquad (2)$$

After differentiating and simplifying, a phase difference ▲ι between $\iota_1$ and $\iota_2$, as shown in FIG. 7, is defined by the following equation:

$$▲\iota = 2\pi n ▲L / \square_0 \qquad (3)$$

wherein ▲L is the length difference $L_2 - L_1$.

The time of arrival of the light signals 1 and 2 at receiving ends 16, 18 of the optical fibers 10, 12, respectively, varies, e.g., the signals will emerge out of the downstream end 18 later than out of the downstream end 16 because the optical fiber 12 is the longest. The arrival phase angles $\iota_1$, $\iota_2$ are different too.

In current practice, controlling phase relationships between signals traveling through multiple fibers, that is a phase relationship between arrival phase angles $i_1$, $i_2$, requires trimming each fiber to a substantially uniform actual length. In the simplest implementation of this practice, initially each fiber is made the same length within a tolerance of an acceptable phase error. Even if only one of a multiplicity of fibers is cut so that its length differs from a relatively uniform length of all other fibers, then either its length will have to be modified by the addition of an extra length of fiber to be spliced to the last fiber and re-trimmed, or all of the previously cut fibers will require re-trimming. Trimming fibers, particularly relatively long fibers, is difficult due to limitations of making the total fiber length measurement. Furthermore, the precision available in instruments used to measure fiber length also negatively affects the effort needed to provide relatively uniform lengths of multiple optical fibers.

It is, therefore, desirable to provide a method of setting an apparent optical length of multiple fibers by controllably affecting a refractive index of individual optical fibers. Also, an apparatus for setting an apparent optical length of multiple fibers utilizing the inventive method is desirable as well.

SUMMARY OF THE INVENTION

The foregoing difficulties encountered by the prior art are addressed and overcome by the inventive method in accordance with which the refractive indexes of multiple fibers, which transmit a fixed light signal or in-phase light signals, are adjusted by controlling the temperature over a portion of the length of each fiber. The refractive indexes are so adjusted that an apparent optical lengths of each fiber, which is a function of a refractive index of fiber and its actual length, is substantially the same. Accordingly, the length of time it takes the signal(s) to travel through the apparent lengths of the fibers is also substantially the same. As a consequence, the interference between the signals emerging from these fibers is substantially minimized.

The inventive method provides for cutting multiple fibers to an actual length approximating a desired actual length, and then trimming the cut fibers. Each individually cut fiber is thermally treated so as to affect a respective refractive index and thus, the apparent optical length of each fiber. As a result, a transmitted signal(s) will travel through multiple fibers in approximately the same amount of time and emerge therefrom within a desired tolerance of an acceptable phase error. The tighter the desired tolerance the better the phase relationship between signals emerging out of multiple fibers.

The inventive method requires selecting a reference value corresponding to a desired arrival phase angle, that is the angle with which an optical signal emerges from each fiber. The desired arrival phase angle is selected so that a difference between the desired phase angle and a determined arrival phase angle, which is measured by a phase shift sensor, will be within a desired tolerance of a phase error. Based on the selected reference value, a multiplicity of fibers is cut approximately to a desired actual length. Ideally, the desired actual length would be equal to the optical apparent length of fiber, which is a function of a refractive index of fiber and its actual length. However, even after cut fibers have been trimmed, to obtain a uniform actual length is very difficult because of the limitations inherent in fiber length measuring and cutting equipment. Accordingly, the lengths of the trimmed fibers have to be further adjusted such that a fixed optical signal or in-phase signals emerging from multiple fibers differ from one another within an acceptable tolerance of a phase error. To accomplish it, each trimmed fiber is thermally treated in a thermal controller to affect a respective refractive index. The thermal treatment of each fiber continues until a difference between a measured arrival phase angle of the fixed optical signal(s) launched into upstream ends of the individual fibers and a desired arrival phase angle will be within the acceptable tolerance of the phase error.

According to the invention, a practical implementation of this method entails assembling small ovens each receiving a length of fiber which is coupled to a central processing unit common to all fibers. The central processing unit can have a source of light generating a monochromatic light beam with a given wavelength. The source of light is coupled to input or upstream ends of individual fiber lengths transmitting the light beam toward downstream ends. To provide measurement of the arrival phase angle, with which the transmitted signal emerges from a downstream end of each individual fiber, the control unit has a phase-shift sensor. In response to determining an arrival phase angle of the transmitted signal, the phase shift sensor generates an output signal sent to a comparator in which the determined arrival phase angle is compared with a stored reference value representing a desired arrival phase angle. Finally, if a difference between the stored reference value and the detected phase angle exceeds a desired tolerance of a phase error, a control signal is generated and fed in a closed loop temperature-control unit. As a result, the temperature in each individual oven can be adjusted so that the difference between the measured and desired arrival phase angles will eventually be within the desired tolerance of the phase error.

Accordingly, once the refractive indices and therefore apparent lengths of multiple fibers are set in accordance with the method of the invention, these fibers have a sufficiently uniform apparent optical length and can be used in a variety of sensors, such as acoustic (e.g. hydrophones), rotation (e.g., gyroscope), strain, temperature, chemical, biological, optical sensors and a host of other types of sensors to provide reliable transmission and reception of signals.

BRIEF DESCRIPTION OF THE DRAWINGS

The above and other objects, features and advantages will become more readily apparent from the specific description of the present invention accompanied by the following drawings, in which:

FIG. 8 is a second diagram illustrating the phase adjustment of optical signal in accordance with the embodiment of the present invention.

DETAILED DESCRIPTION OF THE PREFERRED EMBODIMENTS

Figure 1:
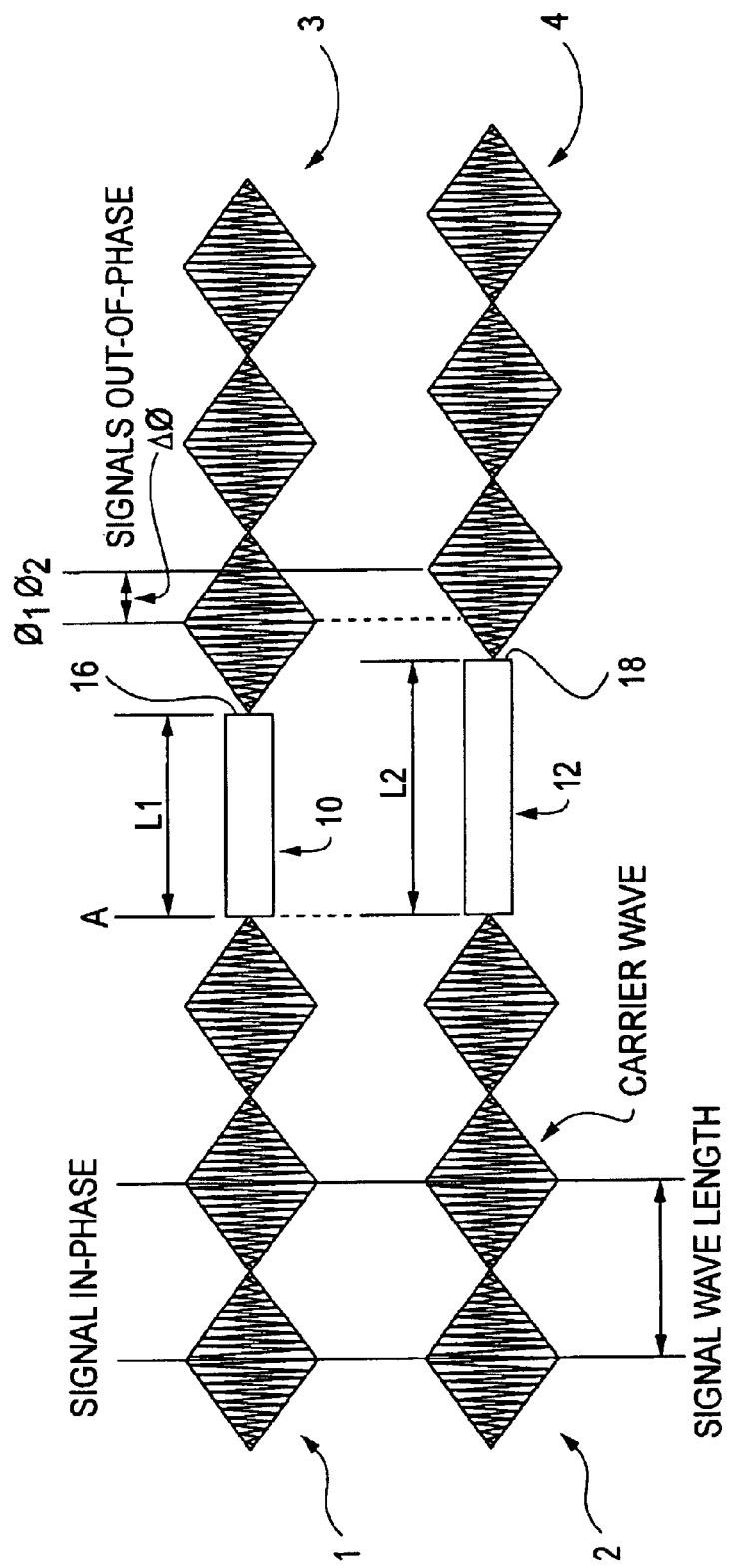
FIG. 1 is a diagram illustrating a principle of the phase relationship of optical signals propagating through two fibers, which have different lengths.
Figure 2:
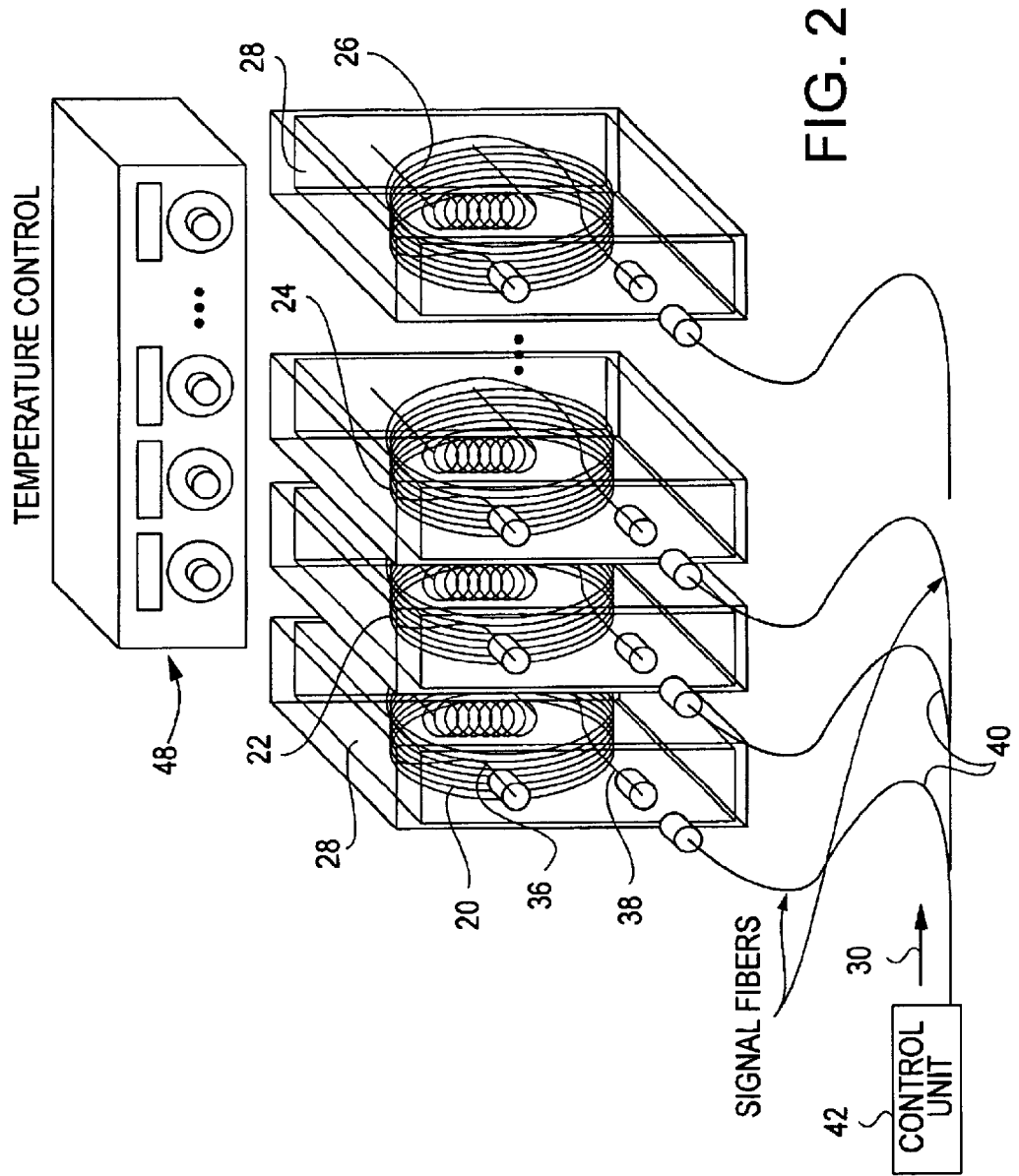
FIG. 2 is a diagrammatic view of a system for setting optical lengths of multiple optical fibers transmitting optical signals in accordance with invention.
Figure 3:
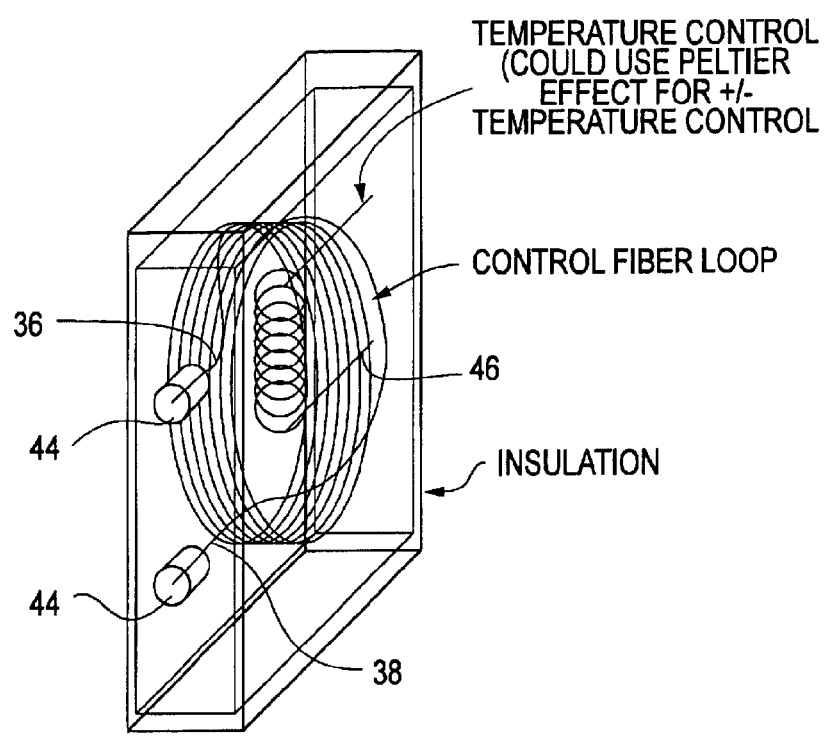
FIG. 3 is a diagrammatic view of an oven having an individual fiber therein.
Figure 4:
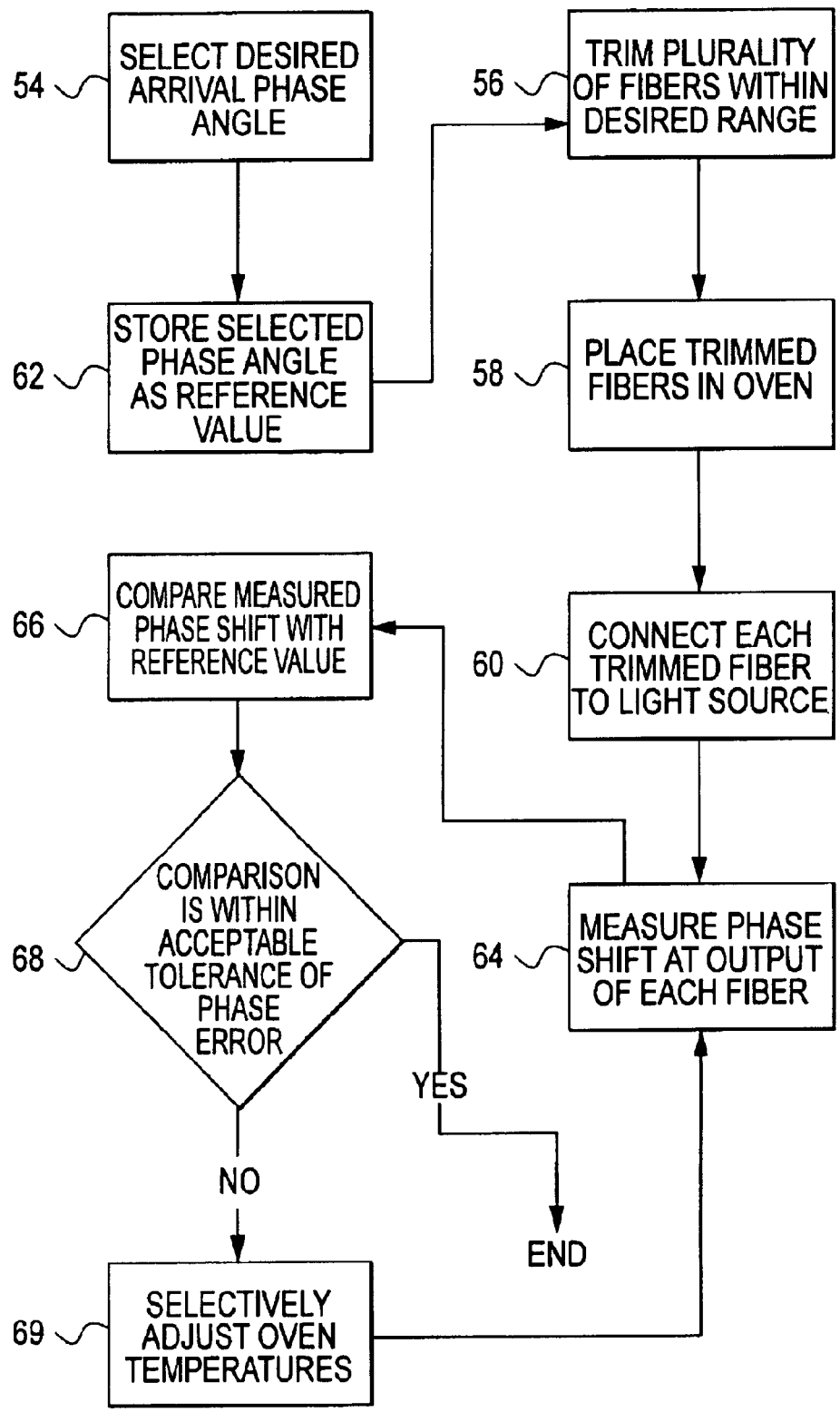
FIG. 4 is a flow chart illustrating a method of operation of the inventive system shown in FIG. 2.

Referring to FIGS. 2–4, the invention is directed to setting optical lengths of multiple optical fibers 20, 22, 24 and 26 by adjusting the refractive indexes of these fibers, which transmit a fixed optical signal or a plurality of in-phase optical signals, as indicated by an arrow 30 (FIG. 2). Adjustment of the refractive indexes continues until a difference between an arrival phase angle, with which this optical signal(s) 30 arrives at downstream ends 36 of the fibers, and a reference value representing a desired arrival phase angle, will be within an acceptable tolerance of a phase shift error. Accordingly, the apparent length of optical fibers can be set, the apparent length of each optical fiber being a function of a respective refractive index and its actual length.

Initially, a reference value representing a desired arrival phase angle is selected in step 54 of FIG. 4 and then the reference value is stored in step 62. Based on the desired arrival phase angle, the optical fibers 20, 22, 24 and 26 (FIG. 2) are substantially trimmed to a certain, desired actual length, as indicated by step 56 of FIG. 4.

Although the fibers are trimmed, their actual trimmed length typically is still not sufficiently uniform due to the limitations of the modem cutting and measuring equipment used for handling long optical fibers. Accordingly, if the fixed signal or in-phase input signals 30 (FIG. 2) are injected into the optical fibers 20, 22, 24, and 26 trimmed approximately to the desired actual length, the optical signal(s) 30 will emerge from downstream ends 36 of the fibers 20, 22, 24, 26 with different arrival phase angles. Of course, this difference in fiber length can be less than an inch, but even such a small difference can and will negatively affect the phase relationships between multiple long fibers transmitting the optical signal(s) 30.

In accordance with the inventive method, after the optical fibers have been cut and trimmed, each of the trimmed fibers is placed in a respective oven 28 (FIGS. 2 and 3) and if necessary is thermally treated, as indicated by step 58 of FIG. 4, to vary a respective refractive index so that a difference between the desired arrival phase angle and the measured one will be within the selected, acceptable tolerance of the phase error.

Preferably, each oven 28 is constructed so that the effect of external environmental factors, such as humidity and the like, capable of affecting heated fibers is practically eliminated. Furthermore, a structure of the oven 28 is advantageously able to stabilize the upstream and downstream ends 38, 36, respectively, of the optical fibers 20, 22, 24 and 26 for coupling at least the upstream ends 38 to signal fibers 40 leading to a central processing unit (CPU) 42, as at step 60. To accomplish this, each of the ovens 28 can be provided with a pair of optical couplers 44 (FIG. 3), which are coupled to the upstream 38 and downstream 36 ends of each of each fiber.

Each of the ovens has a heating element 46 conveniently positioned to maintain a desired temperature inside the ovens 28. Various heating elements, such as a resistor and the like, can be utilized within the scope of this invention. For greater fiber lengths, it has been found that a thermo pair working on the principle of the Peltier effect, which refers to the reversible heating, or cooling occurring at a contact when current flows from one connector to another, is particularly effective.

The heating elements 46 are coupled to an adjustable closed loop temperature control unit 48. Numerous types of such a closed-loop temperature control unit are known and can be utilized within the scope of the invention. It is essential that the temperature control unit maintain temperature to a few millidegrees.

The central processing unit 42, as shown in FIG. 2, is employed to monitor the arrival phase angles at the downstream ends 36 of the fibers 20, 22, 24 and 26 and to measure each of the arrival phase angles in step 64 seen in FIG. 4. The measured arrival phase angle is further compared in step 66 to the desired arrival phase angle, which is stored in step 62. At step 68 it is determined that the difference between the measured and desired arrival phase angles exceeds the desired tolerance of the acceptable phase error, a control signal is generated and fed to the temperature control unit 48. At step 69, the oven temperature is adjusted to vary the refraction index of the fiber. The process returns to step 64, where the phase angles are measured again, and then compared again. If the difference is within the acceptable tolerance of the phase error in step 68, the process ends.

Figure 5:
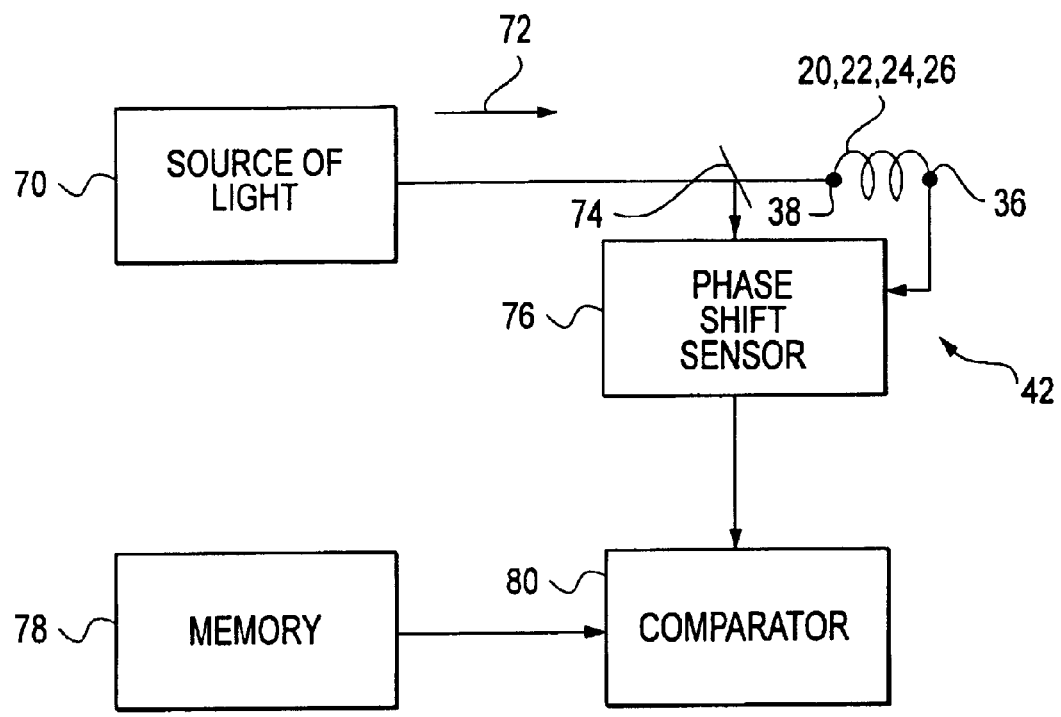
FIG. 5 is a diagrammatic view of a control unit in accordance with one embodiment of the invention.

Referring to FIG. 5, the CPU 42 includes a source 70 of light, which emits a monochromatic beam of light indicated by an arrow 72, which beam is fed into upstream ends 38 of fibers 20, 22, 24 and 26 through the signal fibers 40 (FIG. 2). There are a variety of light sources, such as light emitting diodes (LEDs) and laser diodes (LDs), that can be advantageously used within the scope of this invention.

To measure the arrival phase angle with which the beam of light emerges from downstream ends 36 of fibers 20, 22, 24, and 26, each of these fibers is coupled to the central processing unit 42 on a two-end basis. The two end basis, as shown in FIG. 5, requires that both the input end 38 and the outputs end 36 of each fiber be coupled to a phase shift sensor 76. Accordingly, the input beam 72 generated by the monochromatic light beam source 70 is split into two equal-amplitude signals by a semi-transparent mirror 74. One of the equal-amplitude signals is reflected to the phase shift sensor 76 and the other continues to propagate toward the downstream end 36. The downstream ends 36 of the optical fibers are also coupled to the phase shift sensor 76, which thus measures the arrival phase angle, which is then compared to the desired phase shift angle stored in a memory 78 by a comparator 80.

Figure 6:
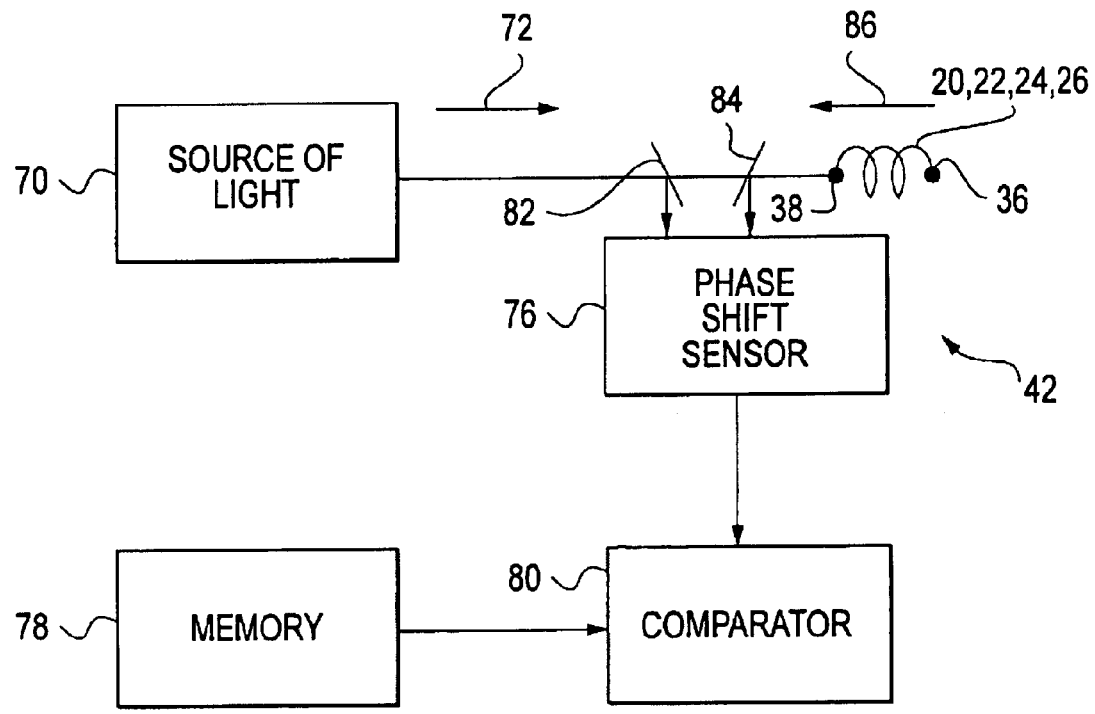
FIG. 6 is a diagrammatic view of a control unit in accordance with another embodiment of the invention.

Alternatively, as shown in FIG. 6, each of the fibers 20, 22, 24 and 26 can be coupled to the central processing unit 42 on a one-end basis. To implement such a connection, two semi-transparent mirrors 82 and 84 can be installed along a path of the monochromatic beam 72. The second semi-transparent mirror 84 reflects a reflected beam 86, which propagates back from the downstream end 36 toward the upstream end 38 due to the reflective properties of optical fiber, to the phase shift sensor 76. Similarly to the embodiment shown in FIG. 5, after the phase-shift sensor 76 has measured the arriving phase shift angle, it is compared by the comparator 80 to the desired phase shift angle stored in the memory 78. Since the downstream ends 36 of the fibers are fixed to the respective couplers 44 and not utilized during the entire duration of the inventive method, the fibers are mounted in ovens in a more stable manner than when both upstream and downstream ends are coupled to the signal fibers 40.

The method and apparatus as disclosed above can be utilized for setting the refractive indexes, and therefore the apparent optical lengths, even if a wavelength of a monochromatic beam of light was not known. In this case, a phase shift sensor measures an input phase angle with which the beam is injected into an upstream end of fiber. An arrival phase angle is also measured and further compared to the measured input phase angle, so that a difference between input and arrival phase angles is determined. The determined difference is in turn compared to a desired phase angle and, if a resulting difference is not within an acceptable tolerance, a control signal is generated and fed to the temperature control unit 48, which will generate an output signal controlling a temperature in a respective oven 28.

Thus, the temperature control unit 48 provides a closed loop thermal control in the ovens so that as conditions change in the fibers system, the control unit will be able to maintain phase relationships by automatically controlling oven temperatures. Limitations on oven full scale temperature range, thermal tolerances of the fiber, and temperature control stability will require initial trimming of the signal fibers 40, so that the overall actual length of the coupled signal and trimmed fibers is substantially uniform. Furthermore, having the actual lengths of signal fibers substantially uniform can facilitate setting of the apparent optical length of a new bundle of optical fibers by a kit or assembly that can include the central processing unit 42, the trimmed signal fibers 40, and the ovens 28 with any suitable temperature control unit 48.

Figure 7:
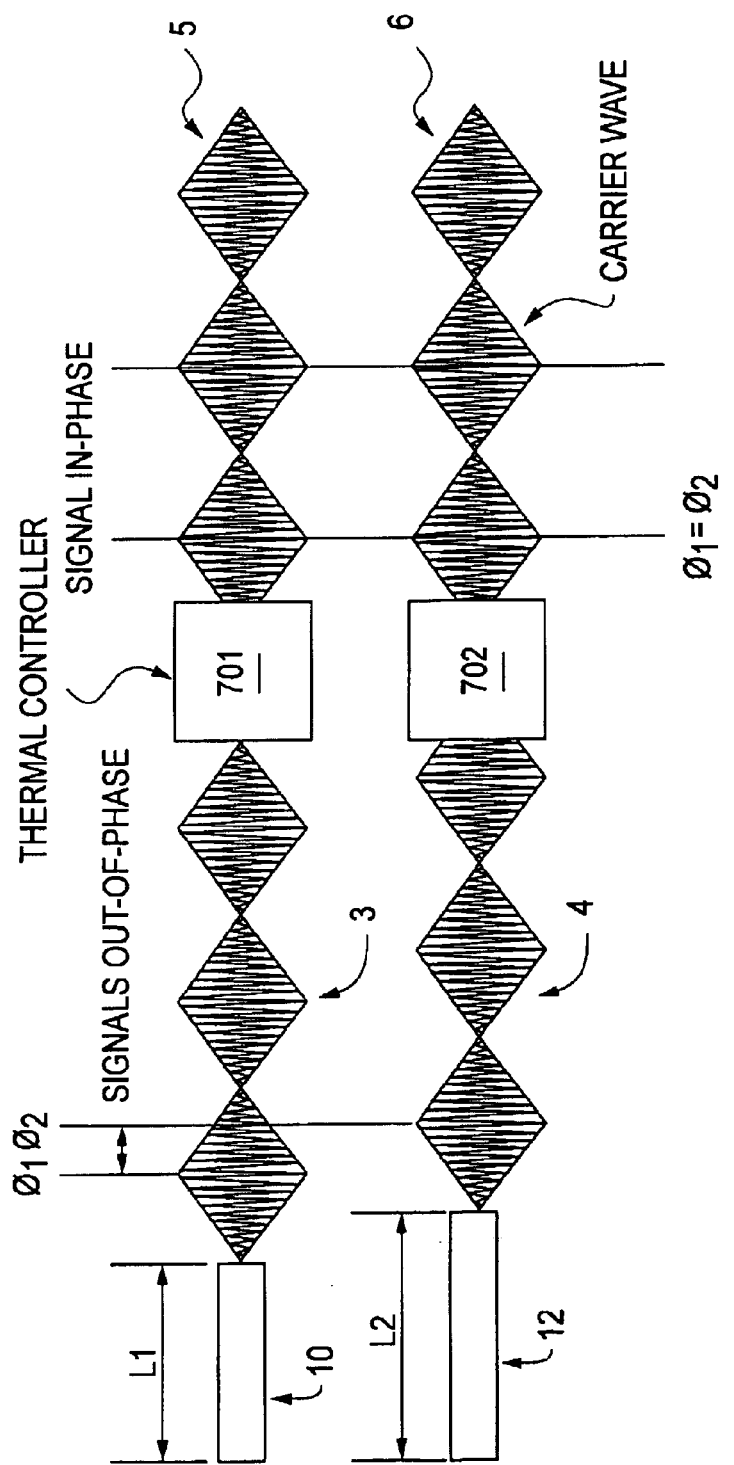
FIG. 7 is a diagram illustrating the phase adjustment of optical signals in accordance with one embodiment of the present invention.

FIG. 7 is a diagram illustrating the phase adjustment of optical signals in accordance with the present invention. Shown in FIG. 7 are optical fibers 10 and 12, output optical signals 3 and 4, thermal controllers 701 and 702, and phase adjusted signals 5 and 6. Thermal controller as used herein refers to at least one oven, a central passing unit, and a temperature control unit. As can be seen in FIG. 7, by passing output optical signals 3 and 4, which are out of phase, through thermal controllers 701 and 702, the index of refraction can be so adjusted such that the resulting phase adjusted signals 5 and 6 are in-phase, that is $\Delta \iota$ is equal to zero, without having to adjust $L_1$ or $L_2$.

FIG. 8 is a second diagram illustrating the phase adjustment of optical signals according to an embodiment of the present invention. Three optical fiber channels (Channel 1, Channel 2 . . . Channel n) are shown, each having a corresponding optical fiber $L_1$, $L_2$ . . . $L_n$, respectively. Optical fibers $L_1$, $L_2$ . . . $L_n$ are of different lengths. At the input of the optical fibers shown in window A, all signals are in-phase. Due to the varying length of the optical fibers $L_1$, $L_2$ . . . $L_n$, the output signals, shown in window B, are out of phase. By passing the signals through the thermal controllers 701, 702 . . . 70n of the present invention, the phases of the signals are realigned as shown in window C.

The following example illustrates the inventive method. The refractive index change can be calculated as $$i.\ n = \Delta \iota \Box_0 / L 2\pi \qquad (4),$$

wherein $\Delta i$ is phase change.

In this example, consider SMF-28 single mode fiber. The index of refraction at a 1310 nm wavelength is equal to 1.4777 and at a 1550 nm wavelength is about 1.4682 at approximately room temperatures. A practical length of fiber to place in a small oven is 100 meters. Amplitude modulated fiber signals may require phase relations held with 1×E4 radians. This requires that the oven temperature be held within 2° C. to keep the reference index within 2.5×E-5. Oven temperatures controllers can maintain temperature to a few millidegrees. This provides a means to control arrival phase angle to within +/-5 to 6 radians for the above two examples wavelengths; thus leaving significant margin for application requiring fairly precise phase angle control.

The inventive thermal control method reduces the difficulty in trimming long signal fibers to precise length in order to match or control the arrival phase angles. This method does not completely eliminate fiber trimming. For example, cutting fibers to length in order to match arrival phase angles to within 1×E4 radians, at a wavelength of 1310 nm, requires cutting the fibers to within 0.2 centimeter. This tolerance exceeds typical optical time domain reflectometer (OTDR) fiber length measurement technology. With the inventive method, requirements to the desired tolerance are significantly reduced. The oven can heat the control fibers 20, 22, 24 and 26 to a temperature about which the arrival phase angle adjustments are made. The gross temperature adjustment would accommodate gross variations in the initial signal fiber lengths. Given that the control fiber may operate in a temperature band from about $-60^B$C to about $+80^B$C, a practical range of oven temperatures would run from ambient temperature to about $+80^B$C. An $80^B$C gross adjustment relaxes the signal fiber 40 relative length measurement to approximately +/-3.8 centimeter. The OTDR has this capability.

As mentioned above, a greater length accommodation is possible by using a Peltier effect thermal controller that can provide both heating and cooling about the nominal ambient temperature. The full thermal band would open overall relative length tolerance to about +/-6 sm. A measurement tolerance is more in line with the capabilities of high sensitivity OTDRs. Fine temperature control would then adjust relative phase angles once the gross adjustment is made. The overall thermal control could then act to beam form the optical signals by adjusting arrival phase angles.

While the invention has been described with reference to its presently preferred embodiment, it has not limited thereto. Rather, this invention is limited only insofar as defined by the following set of patent claims and includes within its scope all equivalents thereof.

What is claimed is:

1. A method of setting an apparent optical length of a multiplicity of optical fibers for a given optical wavelength, comprising the steps of:

(a) trimming the multiplicity of optical fibers to a substantially uniform actual length approximating a desired actual length;

(b) launching a monochromatic beam of light into one end of each of the multiplicity of trimmed optical fibers and determining an arrival phase angle imparted by each of the multiplicity of trimmed optical fibers to the monochromatic beam over the actual length of each of the multiplicity of trimmed optical fibers;

(c) comparing the determined arrival phase angle with a reference value representing a desired arrival phase shift angle; and (d) heating each of the multiplicity of trimmed optical fibers selectively to vary a refractive index thereof in response to comparison of the determined arrival phase angle with the reference value to change the arrival phase angle so as to set a desired apparent length of each of the multiplicity of trimmed optical fibers.

2. The method according to claim 1, further comprising the step of determining whether the comparison between the determined arrival phase angle and the reference value is within an acceptable tolerance of a phase error, the heating of each of the multiplicity of trimmed optical fibers being effected if the comparison exceeds the acceptable tolerance of the phase error.

3. The method according to claim 1, wherein the monochromatic beam of light has a wavelength equal to the given optical wavelength.

4. The method according to claim 1, wherein the monochromatic beam of light has a wavelength different from the given optical wavelength.

5. The method according to claim 1, wherein the monochromatic beam of light is launched into an upstream end of each of the multiplicity of trimmed optical fibers and the arrival phase angle is sensed at a downstream end of each of the multiplicity of trimmed optical fibers.

6. The method according to claim 1, wherein the monochromatic beam of light is launched into an upstream end of each of the multiplicity of trimmed optical fibers and the arrival phase angle is determined at the upstream end of each of the multiplicity of trimmed optical fibers.

7. The method according to claim 1, wherein the apparent lengths of the multiple optical fibers are uniform.

8. The method according to claim 1, wherein the reference value is adjusted so that the apparent lengths of individual optical fibers are different to provide controllable time delays for the monochromatic beam to emerge from the trimmed multiple optical fibers.

9. An apparatus for setting an apparent optical length of a multiplicity of optical fibers for a given optical wavelength, comprising:
   a light source for launching a monochromatic beam of light into an upstream end of each of the multiplicity of optical fibers;
   a multiplicity of phase shift sensors, each phase shift sensor for determining an arrival phase angle imparted by each of the multiplicity of optical fibers to the monochromatic beam over the apparent optical length of each of the multiplicity of optical fibers;
   a comparator comparing the determined arrival phase angle with a reference value representing a desired arrival phase angle;
   a multiplicity of ovens, each oven receiving an optical fiber of each of the multiplicity of optical fibers; and
   a temperature control unit coupled to the multiplicity of ovens for selectively varying a refractive index of each of the multiplicity of optical fibers in response to comparison of the determined arrival phase angle with the reference value by selectively heating each of the multiplicity of optical fibers to change the determined arrival phase angle so as to set a desired apparent optical length of each of the multiplicity of optical fibers.

10. The apparatus according to claim 9, wherein each of the ovens housing each of the multiplicity of optical fibers has a heating element.

11. The apparatus according to claim 10, wherein the heating element is one of a resistance heating element and a Peltier heating element.

12. The apparatus according to claim 10, wherein each of the ovens housing each of the multiplicity of optical fibers has a pair of optical couplers for attaching each of the multiplicity of optical fibers to signal optical fibers coupled to the phase shift sensors.

13. The apparatus according to claim 9, wherein the temperature control unit is a closed loop temperature controller.

14. The apparatus according to claim 9, wherein the light source generating the monochromatic beam of light, the phase shift sensors and the comparator are controlled by a central processing unit.

15. An apparatus for setting an apparent optical length of at least one optical fiber for a given optical wavelength, comprising:
   a light source for launching a monochromatic beam of light into an upstream end of the at least one optical fiber;
   a phase shift sensor for determining an arrival phase angle imparted by the at least one optical fiber to the monochromatic beam over the apparent optical length of the at least one optical fiber;
   a comparator comparing the determined arrival phase angle with a reference value representing a desired arrival phase angle;
   an oven receiving an optical fiber of the at least one optical fiber;
   a temperature control unit coupled to the oven for selectively varying a refractive index of the at least one optical fiber in response to comparison of the determined arrival phase angle with the reference value by selectively heating the at least one optical fiber to change the determined arrival phase angle so an to set a desired apparent optical length of the at least one optical fiber; and
   a semi-transparent mirror located along a path of the monochromatic beam of light, the monochromatic beam of light propagating along the path toward the upstream end of the at least one optical fiber and being split by the semi-transparent mirror into a first signal corresponding to the reference value and into a second signal emerging out of a downstream end of the at least optical fiber, so that the arrival phase angle is determined at the downstream and of the at least one optical fiber;
   wherein the light source generating the monochromatic beam of light, the phase shift sensor and the comparator are controlled by a central processing unit.

16. An apparatus for setting an apparent optical length of at least one optical, fiber for a given optical wavelength, comprising:
   a light source for launching a monochromatic beam of light into an upstream end of the at least one optical fiber;
   a phase shift sensor for determining an arrival phase angle imparted by the at least one optical fiber to the monochromatic beam over the apparent optical length of the at least one optical fiber;
   a comparator comparing the determined arrival phase angle with a reference value representing a desired arrival phase angle;
   an oven receiving an optical fiber of the at least one optical fiber;
   a temperature control unit coupled to the oven for selectively varying a refractive index of the at least one optical fiber in response to comparison of the determined arrival phase angle with the reference value by selectively heating the at least one optical fiber to change the determined arrival phase angle so as to set a desired apparent optical length of the at least one optical fiber; and
   two semi-transparent mirrors located along a path of the monochromatic beam of light, the monochromatic beam of light propagating along the path toward the upstream end of the at least one optical fiber and being split by the first semi-transparent mirror into a first signal and a second signal reflected from an opposite downstream end back to the upstream end and directed to the phase shift sensor by the second semi-transparent mirror, so that the arrival phase angle is determined at the upstream end of the at least one optical fiber;
   wherein the light source generating the monochromatic beam of light, the phase shift sensor and the comparator are controlled by a central processing unit.

17. The apparatus according to claim 9, wherein the refractive index is so adjusted that a difference between the reference value and the determined arrival phase angle does not exceed an acceptable tolerance of a phase error.

* * * * *